US010494822B2

(12) United States Patent
Song

(10) Patent No.: US 10,494,822 B2
(45) Date of Patent: Dec. 3, 2019

(54) ELASTIC PLASTIC FLOOR WHICH IS WITH THE FUNCTIONS OF MOISTURE PROOF AND SOUND INSULATION, AND ITS PRODUCTION METHOD

(71) Applicant: ZHANGJIAGANG ELEGANT PLASTICS CO., LTD., Zhangjiagang (CN)

(72) Inventor: Jincheng Song, Zhangjiagang (CN)

(73) Assignee: ZHANGJIAGANG ELEGANT PLASTICS CO., LTD., Zhangjiagang (CN)

(*) Notice: Subject to any disclaimer, the term of this patent is extended or adjusted under 35 U.S.C. 154(b) by 197 days.

(21) Appl. No.: 14/784,824

(22) PCT Filed: Jun. 19, 2015

(86) PCT No.: PCT/CN2015/081990
§ 371 (c)(1),
(2) Date: Oct. 15, 2015

(87) PCT Pub. No.: WO2016/004817
PCT Pub. Date: Jan. 14, 2016

(65) Prior Publication Data
US 2016/0168868 A1    Jun. 16, 2016

(30) Foreign Application Priority Data

Jul. 7, 2014  (CN) .......................... 2014 1 0320321
Jul. 7, 2014  (CN) .................... 2014 2 0372033 U

(51) Int. Cl.
*B32B 37/14* (2006.01)
*E04F 15/10* (2006.01)
(Continued)

(52) U.S. Cl.
CPC .......... *E04F 15/107* (2013.01); *B32B 37/144* (2013.01); *E04F 15/02172* (2013.01);
(Continued)

(58) Field of Classification Search
CPC . E04F 15/107; E04F 15/105; E04F 15/02172; E04F 2290/041;
(Continued)

(56) References Cited

U.S. PATENT DOCUMENTS 3,308,009 A * 3/1967 Baumgartner, Jr. .... B32B 27/00
428/215
3,917,550 A * 11/1975 Clas ..................... C08K 5/3445
524/297
(Continued)

FOREIGN PATENT DOCUMENTS

CN        2749982 Y      1/2006
CN        201981756 U    9/2011
(Continued)

OTHER PUBLICATIONS

International Search Report for International Patent Application No. PCT/CN2015/081990 dated Aug. 10, 2015. 2 pages. English Translation.

*Primary Examiner* — Ryan D Kwiecinski
(74) *Attorney, Agent, or Firm* — Myron Greenspan Lackenbach Siegel LLP

(57) ABSTRACT

The present invention provides an elastic plastic layer that is moisture proof and sound insulation and its production method. The elastic plastic layer that is moisture proof and sound insulation comprises a wear resistant layer, a decoration layer, a first backing material layer and a moisture proof and sound insulation layer. The adjacent layers are connected in turn by the order. The present invention provides the floor that is not only with the function of sound
(Continued)

insulation, sound absorption, moisture proof, heat preservation, slightly flipping feet, resistance to press, acid and alkali resistance, but also with the positive effect that is low cost, easy molding, good in mechanical properties, and it is also good in laying effect, inflaming retarding, anti-skidding, easily laying, except that, since the wear resistant layer of the floor is coated with the ultraviolet-curable coating, so that it further improves the scratch-resistant property of the floor.

7 Claims, 2 Drawing Sheets

(51) Int. Cl.
  *E04F 15/02* (2006.01)
  *B32B 37/06* (2006.01)
  *B32B 37/10* (2006.01)
(52) U.S. Cl.
  CPC ...... *E04F 15/02183* (2013.01); *E04F 15/105* (2013.01); *B32B 37/06* (2013.01); *B32B 37/10* (2013.01); *B32B 2307/102* (2013.01); *B32B 2307/56* (2013.01); *B32B 2307/71* (2013.01); *B32B 2307/73* (2013.01); *B32B 2309/02* (2013.01); *B32B 2309/04* (2013.01); *B32B 2309/12* (2013.01); *E04F 2290/041* (2013.01); *E04F 2290/043* (2013.01)
(58) Field of Classification Search
  CPC .... E04F 2290/043; E04B 1/8409; E04B 1/64; E04B 1/82; E04B 2001/8461; B32B 37/14; B32B 37/06; B32B 37/08; B32B 37/144; B32B 2307/102; B32B 2307/71; B32B 2307/56; B32B 2307/73; E04C 2/26; B29C 66/0342; B29C 66/349; B29C 66/3492; B29C 66/3494
  USPC .......... 52/177, 589.1, 591.1, 592.1; 156/311; 428/189, 411.1, 426, 688, 446, 702, 354, 428/215, 332, 213
  See application file for complete search history.

(56) References Cited

U.S. PATENT DOCUMENTS

| | | | | |
|---|---|---|---|---|
| 4,104,103 A * | 8/1978 | Tarullo | ...................... | B32B 9/02 156/229 |
| 4,420,351 A * | 12/1983 | Lussi | ...................... | B32B 21/08 156/62.4 |
| 4,863,540 A * | 9/1989 | Catalano | ............ | B29C 35/0227 156/285 |
| 5,178,946 A * | 1/1993 | Sato | ........................ | B32B 27/08 428/412 |
| 5,554,252 A * | 9/1996 | Foran | ...................... | B29C 65/10 156/311 |
| 5,709,925 A * | 1/1998 | Spengler | ............... | B29C 70/021 428/198 |
| 5,894,048 A * | 4/1999 | Eckart | ...................... | B32B 27/08 264/239 |
| 6,077,907 A * | 6/2000 | Raetzsch | ................. | C08L 23/10 264/219 |
| 6,093,473 A * | 7/2000 | Min | ........................ | B32B 27/10 428/147 |
| 6,641,629 B2 * | 11/2003 | Safta | ...................... | D21H 27/28 51/298 |
| 6,720,065 B1 * | 4/2004 | Cosentino | ............... | B32B 27/00 156/308.2 |
| 7,615,276 B1 * | 11/2009 | Goodson | ................. | B32B 3/266 156/244.11 |
| 8,074,339 B1 * | 12/2011 | Brandt | .................... | E04C 2/421 29/527.1 |
| 8,241,714 B2 * | 8/2012 | Adickes | ............ | B32B 17/10036 428/13 |
| 8,821,908 B2 * | 9/2014 | Bolte | .................... | A01N 43/653 424/402 |
| 9,267,285 B2 * | 2/2016 | Tauferner | .................. | B32B 5/02 |
| 9,476,202 B2 * | 10/2016 | Clancy | .................. | E04B 1/6104 |
| 9,745,758 B2 * | 8/2017 | Baert | ...................... | E04F 13/18 |
| 2001/0038910 A1 * | 11/2001 | MacQueen | ............... | B44C 3/00 428/327 |
| 2002/0020827 A1 * | 2/2002 | Munzenberger | ... | C08G 18/4018 252/3 |
| 2002/0122926 A1 * | 9/2002 | Goodson | ................. | B32B 27/12 428/220 |
| 2002/0144778 A1 * | 10/2002 | Belias | ...................... | B29C 65/38 156/311 |
| 2002/0160680 A1 * | 10/2002 | Laurence | ................. | B32B 27/36 442/394 |
| 2002/0189755 A1 * | 12/2002 | Calmidi | .................. | B30B 5/067 156/311 |
| 2003/0024199 A1 * | 2/2003 | Pervan | ..................... | E04F 15/04 52/589.1 |
| 2004/0115399 A1 * | 6/2004 | Sjolin | ...................... | B32B 27/04 428/142 |
| 2005/0032934 A1 * | 2/2005 | Muenzenberger | ....... | C08L 33/08 523/179 |
| 2005/0281997 A1 * | 12/2005 | Grah | ......................... | B32B 7/02 428/215 |
| 2006/0106135 A1 * | 5/2006 | Gan | ........................ | C08K 5/523 523/451 |
| 2006/0173145 A1 * | 8/2006 | Pawlow | ................. | C07F 7/1892 526/171 |
| 2006/0276617 A1 * | 12/2006 | Yano | ...................... | C08F 290/06 528/272 |
| 2008/0227354 A1 * | 9/2008 | Yoshida | .................. | B29C 43/18 442/388 |
| 2008/0254275 A1 * | 10/2008 | Ashikaga | ................ | B32B 27/08 428/304.4 |
| 2008/0292848 A1 * | 11/2008 | Xie | ............................ | B32B 7/12 428/174 |
| 2009/0054559 A1 * | 2/2009 | Serizawa | ................ | C08F 289/00 524/9 |
| 2009/0084049 A1 * | 4/2009 | Clark | .................... | F16B 5/0092 52/177 |
| 2009/0087775 A1 * | 4/2009 | Kunou | ..................... | C08F 20/28 430/270.1 |
| 2009/0234072 A1 * | 9/2009 | Nakagawa | ............... | C08L 83/06 525/100 |
| 2010/0105798 A1 * | 4/2010 | Hasegawa | ............... | C08F 299/00 522/99 |
| 2011/0287237 A1 * | 11/2011 | Riebel | ..................... | B32B 27/06 428/195.1 |
| 2012/0009400 A1 * | 1/2012 | Nauer | ....................... | B32B 5/02 428/215 |
| 2012/0103722 A1 * | 5/2012 | Clausi | ...................... | B32B 25/14 181/294 |
| 2013/0065072 A1 * | 3/2013 | Pervan | ................. | B32B 37/0015 428/537.1 |
| 2013/0164679 A1 * | 6/2013 | Kounou | .................. | G03F 7/0757 430/280.1 |
| 2013/0266759 A1 * | 10/2013 | Kim | ....................... | E04F 15/107 428/106 |
| 2014/0057066 A1 * | 2/2014 | Cai | ........................... | E04C 2/044 428/70 |
| 2014/0109507 A1 * | 4/2014 | Dossche | .................. | B32B 21/04 52/588.1 |
| 2014/0170359 A1 * | 6/2014 | Schwitte | ................. | E04F 15/107 428/41.5 |
| 2014/0311086 A1 * | 10/2014 | Braun | ...................... | B32B 5/18 52/783.1 |
| 2014/0349084 A1 * | 11/2014 | Patki | ....................... | E04B 1/82 428/189 |
| 2016/0152015 A1 * | 6/2016 | Unvericht | ................ | B32B 27/20 428/141 |

(56) References Cited

U.S. PATENT DOCUMENTS

| | | | |
|---|---|---|---|
| 2016/0168868 A1* | 6/2016 | Song | E04F 15/206 |
| | | | 52/177 |
| 2016/0200092 A1* | 7/2016 | Doehring | B05D 7/586 |
| | | | 52/588.1 |
| 2018/0016410 A1* | 1/2018 | Liu | C08K 3/26 |
| 2018/0298620 A1* | 10/2018 | Pailler | C08J 5/24 |

FOREIGN PATENT DOCUMENTS

| | | |
|---|---|---|
| CN | 104074339 A | 10/2014 |
| CN | 204081389 U | 1/2015 |

\* cited by examiner

ELASTIC PLASTIC FLOOR WHICH IS WITH THE FUNCTIONS OF MOISTURE PROOF AND SOUND INSULATION, AND ITS PRODUCTION METHOD

CROSS-REFERENCE TO RELATED PATENT APPLICATIONS

This application is a U.S. National Phase Application under 35 U.S.C. § 371 of International Patent Application No. PCT/CN2015/081990, filed Jun. 19, 2015, and claims priority of Chinese Application Nos. 201410320321.X and 201420372033.4, both filed Jul. 7, 2014, all of which are incorporated by reference in their entireties.

1. FIELD OF THE INVENTION

The present invention relates to an elastic plastic floor and its producing method, and especially to an elastic plastic floor which is with the functions of moisture proof and sound insulation and its production method.

2. DESCRIPTION OF THE RELATED ART

With the rapid development of the economic construction, the harm to the people caused by the noise has increased seriously. Generally, in accordance with its generation mechanism, noise can be roughly classified as mechanical noise, aerodynamic noise and electromagnetic noise etc. And the most closely related to our life is urban noise. Its prime source can also be classified as factory noise, construction noise, traffic noise and activity noise. With the improvement of the living standard and the development of the industry and transportation, it becomes more and more meaningful to noise control.

Floors are made from wood and other material. In accordance with its material and its purpose, floor can be classified as solid wood floor, parquet, laminating floor, bamboo floor, cork floor, geothermal heating floor, plastic floor, anti-static floor, bamboo-wood compound floor, curve floor, and natural landscape geomancy floor.

Plastic floor also known as "light weight floor" is paved with plastic material. In accordance with its using state, plastic floor can be classified as two types, which are bulk material (or floor tile) and coiled material (or floor leather). In accordance with its material, it can be classified as 3 types, which are hard, semi-hard, and soft (elastic). In accordance with its basic raw material, it can be classified as polyvinyl chloride plastics, polyethylene plastic and Polypropylene plastic etc. Specifically, the principle raw material is polyvinyl chloride and its copolymer resin, and the auxiliary materials is adding filler, plasticizer, stabilizer, colorant and so on, and then produce the floor on the flake continuous substrate with the technology of coating, calendering, extruding or extrusion. In contrast to other floor, the advantages of the plastic floor have the following aspects: (1). water-proof and antiskid, (2). super wear-resistant, (3). lighter weight, (4). good in warmth, (5). fire-retardant, (6). acid & alkali resistance, (7). environment protecting, non-toxic, no side effect to human body and environment, and without radioactive element.

Laminate floor is also known as impregnated paper laminating wood parquet/laminate wood floor, which consists of wearing layer, decorating layer, high-density substrate layer, balancing (moisture proof) layer. The laminate floor is produced by paving one or more dedicated paper impregnated with thermoset amino resin on the chipboard, high density fiberboard and other kind of artificial board substrate surface layer, then adding balancing layer on the back and wearing layer on the front, lastly treated with hot-press and molding. The laminate floor has the following aspects: wear-resistance, rich in style, shock resistance, deformation resistance, fouling resistant, flame retardant, moisture proof, environment protection, fastness, easy in assembly, easy in taking care, available with floor heating etc. However, the disadvantage of the laminate floor is that the laminate floor itself contains vast of adhesive so that the content of formaldehyde exceeds easily. It would be harmful to human health, if human body stays at thus environment for a long time.

In accordance with its sound-absorbing principle, sound absorbing floor generally has two types of porous absorbing floor and resonance absorbing floor. The porous absorbing floor uses the material such as centrifugal glass wool, rock wool, mineral wool, vegetable fiber spraying etc. which has a large number of small communicating pores to make the sound waves penetrate into the material along the pores, as a result the sound waves nib with the material and transform the sound energy into the heat energy. The resonance absorbing floor use the material with resonance structures that vibrate under the excitation of sound waves, as a result the vibrating object nib with itself and air to transform part of the sound energy into the heat energy.

Sound absorbing floor is also known as soundproof floor. General sound absorbing floor consist of three-layer construction in which the interlayer is density board, the surface layer and the bottom layer are both made from the bark of oak so that the sound absorbing floor has a soft texture. The most common sound absorbing floor is a plastic polyvinyl chloride sound absorbing floor, which is made of decorative finish, core materials and sound absorbing mat, and is crafted according to the acoustical principle of wood trough and wood hole. Nowadays, it is mainly used in museum, cinema, grand conference room, gymnasium, bar and other places. In those public places, sound absorbing floor can not only reduce the noise, but also has the characteristics of environment protection, flame retardant, thermal insulation and moisture proof. Additionally, sound absorbing floor is also wildly applied to the roof and the slope required insulation of the large outdoor recreation places.

To reduce the noise, in the prior art it commonly uses the combination of sound absorbing floor and laminate floor, China patent CN201210479666.0 discloses a sound insulation and vibration reduction floor which is characterized by comprising a decoration panel layer, a vibration reduction and sound absorption material layer and a first sound absorption and vibration reduction film layer arranged between the decoration panel layer and a rubber layer, wherein a second sound absorption and vibration reduction film layer is arranged below the vibration reduction and sound absorption material layer, and the decoration panel layer, the first sound absorption and vibration reduction film layer, the vibration reduction and sound absorption material layer and the second sound absorption and vibration reduction film layer are bonded into a whole through an adhesive. The sound insulation and vibration reduction floor has good sound insulation and vibration reduction effects, and is particularly suitable for being used in multi-story buildings. However, the floor is the combination of hard material and soft sound absorbing material. The hard material on the front cannot produce good synergistic effect with the soft sound absorbing material, and, since the concept of environment protection has been taken seriously by people, the combination of laminate floor and sound absorbing material would not exist for a long time for sure.

SUMMARY OF THE INVENTION

The present invention provides a elastic plastic floor, which is moisture proof and sound insulation, and its producing method.

The first aspect of the present invention discloses a elastic plastic floor that is moisture proof and sound insulation. The elastic plastic floor that is moisture proof and sound insulation comprises a wear resistant layer, a decoration layer, a first backing material layer and a moisture proof and sound insulation layer, wherein the first backing material layer is located between the decoration layer and the moisture proof and sound insulation layer; the decoration layer is located between the first backing material layer and the wear resistant layer; one surface of the decoration layer is printed with figures and patterns, and the surface is connected with the wear resistant layer.

One preferred embodiment of the present invention is that the floor also comprises a second backing material layer, the moisture proof and sound insulation layer is located between the first backing material layer and the second backing material layer.

Preferably, the thickness of the wear resistant layer is 0.01-3 mm, such as 0.05 mm or 2.5 mm. It is preferred to be 0.1-2 mm, such as 1.5 mm, and it is more preferred to be 0.1-1 mm, such as 0.3 mm, 0.8 mm etc.

Preferably, the thickness of the moisture proof and sound insulation layer is 0.1-6 mm. It is preferred to be 0.3-5 mm, and it is more preferred to be 0.5-4 mm.

Preferably, the thickness of the elastic plastic floor that is moisture proof and sound insulation layer is 0.1-10 mm. It is preferred to be 1-8 mm, and it is more preferred to be 2-6 mm, and it is even more preferred to be 2.5-6 mm.

Preferably, the first backing material layer and the second backing material layer can also be two-layer or multi-layer, such as two-layer, three-layer, four-layer etc. The thickness or the density between each layers can be the same, or different.

Preferably, the shape of the elastic plastic floor that is moisture proof and sound insulation can be any one of circular, ellipse, triangle, quadrangle, pentagon, or polygon, preferably, it's a quadrilateral.

Preferably, the quadrilateral can be any one of rectangular, square, rhombic, parallelogram etc.

Another aspect of the present invention discloses a producing method of the elastic plastic floor that is moisture proof and sound insulation. The method comprises the following steps: step 1: overlaying the wear resistant layer, the decoration layer and the first backing material layer in the order described above, and hot-pressing them into a semi-finished product; step 2: processing the semi-finished product of step 1 via a latter process 1; step 3: compounding the semi-finished product which has processed by the latter process 1 of step 2 and the moisture proof and sound insulation layer, and obtaining the elastic plastic floor that is moisture proof and sound insulation.

Preferably, the producing method of the elastic plastic moisture that is moisture proof and sound insulation, wherein, before step 3, it also comprises the step of trimming and testing the semi-finished product which has processed by the latter process 1 of step 2.

Preferably, the producing method of the elastic plastic moisture that is moisture proof and sound insulation, wherein, before step 1, it also comprises the step of producing the wear resistant layer and the backing material layer.

Preferably, the compounding technology of step 3, can be gluing the semi-finished product which has processed by the latter process 1 of step 2 and the moisture proof and sound insulation layer which carries the glue.

Preferably, the compounding technology of step 3, can be gluing the semi-finished product which has disposed by the latter process 1 of step 2 and the moisture proof and sound insulation layer by one or both of them with glue.

Preferably, in step 3, after compounding the semi-finished product which has disposed by the latter process 1 of step 2 and the moisture proof and sound insulation layer, it also comprises a latter process 2. The latter process 2 can be one or more of the steps of cutting test, polishing and smoothing.

Preferably, the condition for the hot-pressing technology in step 1 is at 110-150° C. and under the pressure of 40-90 kg for 20-40 minutes.

Preferably, the latter process 1 in step 2 contains the cold-pressing technology, and the condition for the cold-pressing technology in step 2 is at 15-40° C. and under the pressure of 40-90 kg for 10-30 minutes.

As one of the preferred embodiments of the present invention, the floor can also comprise a ultraviolet-curable coating, the ultraviolet-curable coating is applied on the surface of the wear resistant layer which does not connect with the decoration layer.

Preferably, the ultraviolet-curable coating comprises oligomer, monomer, photoinitiator and auxiliaries.

The third aspect of the present invention discloses a producing method of the elastic plastic floor that is moisture proof and sound insulation, the method comprises the following steps: step 1: overlaying the wear resistant layer, the decoration layer, the first backing material layer, the moisture proof and sound insulation layer and the second backing material layer by order, and complex pressing them into a semi-finished product; step 2: processing the semi-finished product of step 1 via a latter process 2 into the elastic plastic floor that is moisture proof and sound insulation.

Preferably, before step 1, it also comprises the step of producing the wear resistant layer and the backing material layer.

As one of the preferred embodiments of the present invention, the pressing process in step 1 is hot-pressing technology.

Preferably, the condition of hot-pressing in the step 1 is at 160-200° C. for 20-40 minutes.

Preferably, the procession of complex pressing can be composition with glue, and it can use the glue that comes from the moisture proof and sound insulation layer to glue with the first backing material layer and the second backing material layer. It can also use the way that the glue is roller-coated in the first backing material layer and the second backing material layer, and then glue them with the moisture proof and sound insulation layer which also carries the glue.

Preferably, the latter process 2 in step 2 can be one or more steps of cutting test, polishing and smoothing.

Preferably, the condition for the hot-pressing technology in step 1 is at 160-200° C. for 20-80 minutes, and it is preferred to be at 170-190° C. for 40-60 minutes.

Preferably, the latter process 2 in step 2 includes a cooling process, the condition for the cooling process technology is at 20-60° C. for 20-80 minutes, and it is preferred to be at 30-60° C. 30-60 minutes.

As one of the preferred embodiments, the floor can also comprise a ultraviolet-curable coating, the ultraviolet-curable coating is applied on the surface of the wear resistant layer which does not connect with the decoration layer.

Preferably, the elastic plastic floor that is moisture proof and sound insulation comprises a organic polymer and/or inorganic filler.

Preferably, the wear resistant layer includes one or more of organic polymer, plasticizer, lubricant, stabilizer, and other kinds of auxiliary materials.

Preferably, the organic polymer of the wear resistant layer can be one or more of Polyvinylchlorid resin, vinyl resin, melamine resin. It is preferred to be the mixture of the Polyvinylchlorid resin and vinyl resin.

As one of the preferred embodiments, the decoration layer includes Polyvinylchlorid resin, and it is preferred that the surface of the Polyvinylchlorid resin membrane is printed with figures and patterns.

As one of the preferred embodiments, the backing material comprises a organic polymer, a inorganic layer, a plasticizer, a stabilizer and other auxiliary materials. Preferably, the organic polymer can be one or more of Polyvinylchlorid resin, vinyl resin, melamine resin etc. More preferably, the organic polymer can be the mixture of Polyvinylchlorid resin and vinyl resin.

Preferably, the mass ratio of the backing material is: the organic polymer accounting for 10-50%, the filler accounting for 40-80%, the plasticizer accounting for 8-30%, the stabilizer accounting for 0.2-1%, and the others accounting for 0-40%.

As one of the preferred embodiments, the moisture proof and sound insulation layer includes elastic sound insulation material; preferably, the elastic sound insulation material includes one or more of the organic polymers of a expanded ethylene-vinyl acetate copolymer, a expanded polyethylene, a styrene butadiene rubber, a neoprene. More preferably, it includes the expanded ethylene-vinyl acetate copolymer and the expanded Polyethylene.

The beneficial effects of the present invention are that: the elastic plastic floor that is moisture proof and sound insulation of the present invention comprises a polyvinyl chloride floor and a elastic moisture proof and sound insulation material. The elastic moisture proof and sound insulation material is a expanded ethylene-vinyl acetate copolymer, a expanded polyethylene or other expanded polymer material, thus the floor of the present invention is not only sound insulation, sound absorption, moisture proof, heat preservation, slightly flipping feet, resistance to press, acid and alkali resistance, but also low cost, easy molding, good in mechanical properties, and it also has the properties of moisture proof, sound insulation etc. Additionally, the dimensional stability of the floor is good, and it is also good in laying effect, inflaming retarding, anti-skidding, easily laying etc., except that, since the wear resistant layer of the floor is coated with the ultraviolet-curable coating, so that it further improves the scratch-resistant property of the floor.

BRIEF DESCRIPTIONS OF THE DRAWINGS

Figure 1:
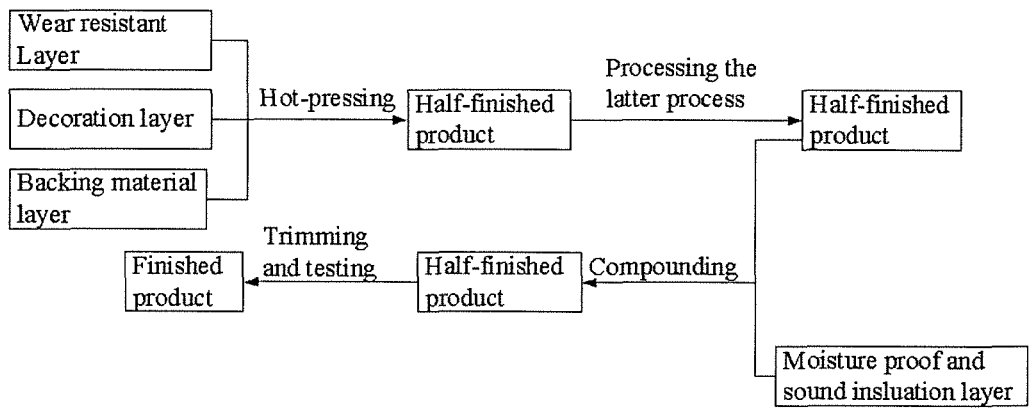
FIG. 1 is the process flow diagram of the producing of the elastic plastic floor that is moisture proof and sound insulation according to the present invention.
Figure 2:
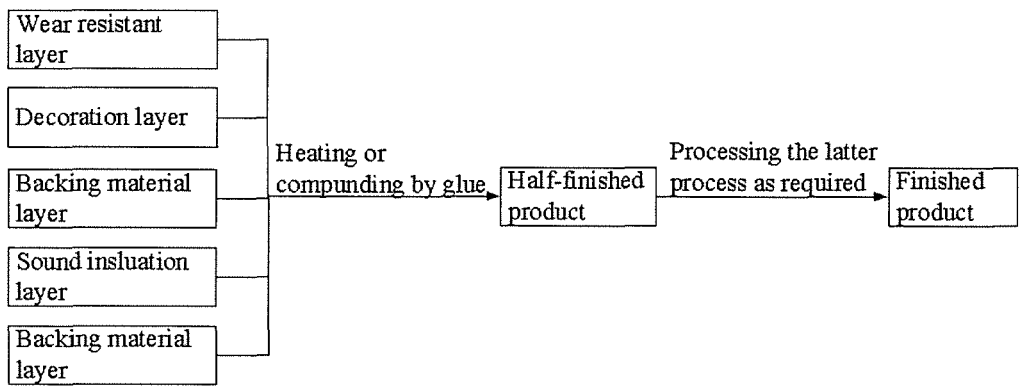
FIG. 2 is another process flow diagram of the producing of the elastic plastic floor that is moisture proof and sound insulation according to the present invention.
Figure 3:
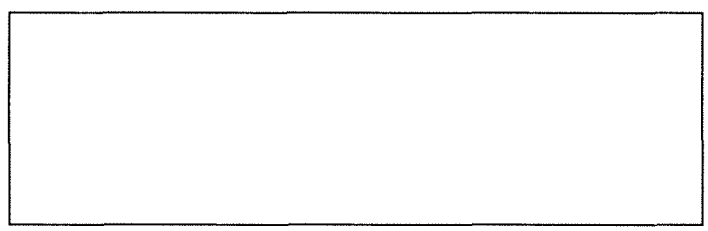
FIG. 3 is the top view of the elastic plastic floor that is moisture proof and sound insulation provided by the present invention.
Figure 4:
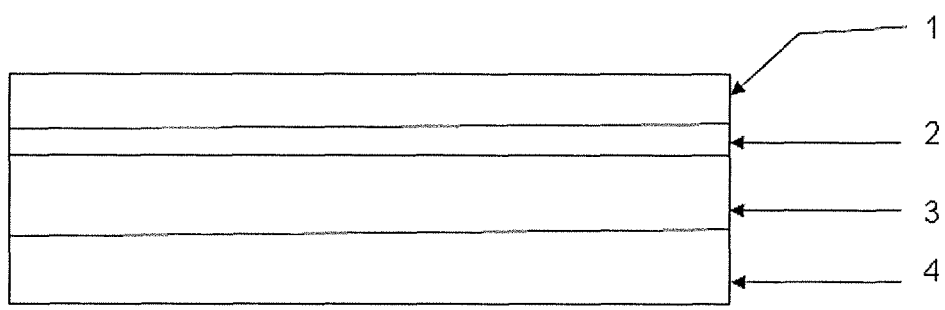
FIG. 4 is the front view of the elastic plastic floor that is moisture proof and sound insulation provided by the present invention.
Figure 5:
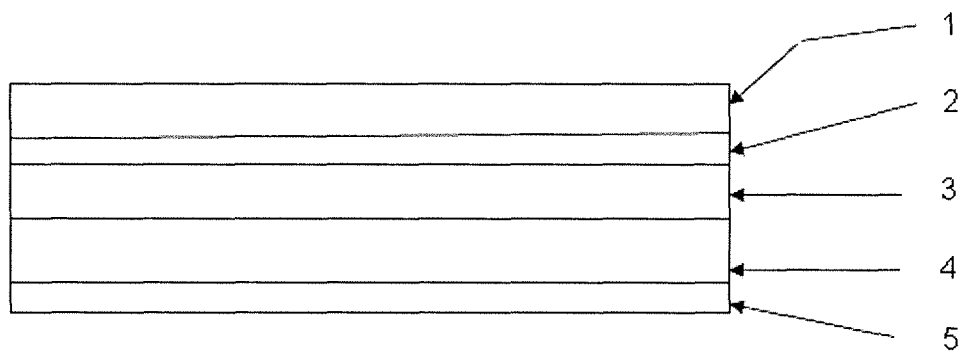
FIG. 5 is another front view of the elastic plastic floor that is moisture proof and sound insulation provided by the present invention.

1. The wear resistant layer; 2. The decoration layer; 3. The first backing material layer; 4. The moisture proofing and sound insulation layer; 5. The second backing material layer.

DETAILED DESCRIPTIONS

Embodiment 1

A Production of the Elastic Plastic Floor that is Moisture Proof and Sound Insulation Press a wear resistant layer, a decoration layer and a first backing material layer under the pressure of 90 kg at 110° C. for 20 minutes to produce a semi-finished product. Cool the obtained semi-finished product at 25° C., under the pressure of 50 kg for 20 minutes, and then compound it with a moisture proof and sound insulation layer which carries with a glue. After trimming and testing the semi-finished product which is obtained from composition, the elastic plastic floor that is moisture proof and sound insulation is obtained.

A Performance Test of the Elastic Plastic Floor that is Moisture Proof and Sound Insulation Divide the plastic floor into comparison group and experimental group. The comparison group is the normal elastic plastic floor commonly seen in the markets, and the experimental group is the elastic plastic floor that moisture proof and sound insulation provided by the application, which adopt the standard of ASTM E2179-09 to test, and the test steps are as follows:

1. the preparation before test:

1.1 choosing a sample, and each group drawing three samples randomly, making the samples into isometrical rectangles which are 1.2*0.6 m;

1.2 putting a adhesive onto the surfaces of samples carefully so that the adhesive covers the surfaces of the entire samples;

1.3 recording the indoor temperature, and controlling the indoor temperature at 20-25° C.;

1.4 aging the samples to determinate the aging time according to the test method of E492 and E90;

2. the test steps:

recording the data of Lo, Lc etc., and calculation the value of T, Ld and sound insulation performance;

after completion of the test, recording the average value of the sound insulation performance of each group, the results as shown below:

| Group | Thickness (mm) | Sound insulation (db) |
| --- | --- | --- |
| Experimental group | 6 | 30 |
| Comparison group | 6 | 12 |

Table 1, the comparison of the sound insulation performance of different plastic floors as shown in table 1, under the condition of the thickness of the floor being the same, to compare with the common elastic plastic floor in the market, the sound insulation performance of the elastic plastic floor provided by the application having been improved a lot.

Embodiment 2

A Production of the Elastic Plastic Floor that is Moisture Proof and Sound Insulation Press a wear resistant layer, a decoration layer and a first backing material layer under the pressure of 40 kg at 150° C. for 40 minutes to produce a semi-finished product. Cool the obtained semi-finished product at 15° C., under the pressure of 90 kg for 30 minutes, and then apply glue onto a side of the first backing material layer of the semi-finished product produced to compound with the moisture proof and sound insulation layer. After the half finished product obtained from composition being trimming and testing, the elastic plastic floor that is moisture proof and sound insulation is obtained.

Embodiment 3

A Production of the Elastic Plastic Floor that is Moisture Proof and Sound Insulation Press a wear resistant layer, a decoration layer, a first backing material layer, a sound insulation layer and a second backing material layer at 160° C. for 80 minutes to produce a semi-finished product. Cool the obtained semi-finished product at 20° C. for 20 minutes. After the semi-finished product obtained from cooling being punching and testing, the elastic plastic floor that is moisture proof and sound insulation is obtained.

Embodiment 4

A Production of the Elastic Plastic Floor that is Moisture Proof and Sound Insulation Press a wear resistant layer, a decoration layer, a first backing material layer, a sound insulation layer and a second backing material layer at 200° C. for 20 minutes to produce a semi-finished product. Cool the obtained semi-finished product at 60° C. for 80 minutes. After the semi-finished product obtained from cooling being punching and testing, the elastic plastic floor that is moisture proof and sound insulation is obtained.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof. Any people skilled in the art can make possible changes and modifications, or equivalents thereof for the technical solution of the invention according to the above method without falling out of the scope of the invention. Therefore, the various modifications and equivalent arrangements without departing away from the technical solution of the invention are included within the spirit and the scope of the technical solution of the invention.

What is claimed is:

1. A method of making an elastic plastic floor, the method comprises the following steps:
    (a) hot-pressing a wear resistant layer, a decoration layer and a first backing material layer, at 110-150° C., under a pressure of 40-90 kg/cm$^2$ for 20-40 minutes, to form an intermediate product, wherein the decoration layer is between the wear resistant layer and the first backing material layer;
    (b) cold-pressing the intermediate product at 15-40° C. and under a pressure of 40-90 kg kg/cm$^2$ for 10-30 minutes;
    (c) compounding the first backing material layer of the intermediate product to a moisture proof and sound insulation layer to produce the elastic plastic floor, wherein the elastic plastic floor is moisture proof and sound insulated, and wherein the moisture proof and sound insulation layer comprises one or more polymers of an expanded ethylene-vinyl acetate copolymer, an expanded polyethylene, a styrene butadiene rubber or a neoprene, and wherein the thickness of the moisture proof and sound insulation layer is 0.1-6 mm; and
    wherein the first backing material layer comprises 10-50 wt % organic polymer, and the organic polymer is a mixture of Polyvinylchloride resin and vinyl resin; and
    the wear resistant layer has a surface that comprises an ultraviolet-curable coating, and wherein the surface of the wear resistant layer does not touch or abut the decoration layer, and the ultraviolet-curable coating comprises oligomer, monomer and a photoinitiator.

2. The method of claim 1, wherein the moisture proof and sound insulation layer comprises a glue that compounded the moisture proof and sound insulation layer to the first backing material layer of the intermediate product.

3. The method of claim 1, wherein the wear resistant layer comprises one or more organic polymer, plasticizer, lubricant, or stabilizer.

4. The elastic plastic floor of claim 1 further comprising a second backing material layer, wherein the moisture proof and sound insulation layer is between the first backing material layer and the second backing material layer.

5. The elastic plastic floor of claim 1, wherein the wear resistant layer has a thickness of 0.01-3 mm.

6. A method of making an elastic plastic floor, the method comprises the following steps:
    (a) compounding a wear resistant layer, a decoration layer, a first backing material layer, a moisture proof and sound insulation layer and a second backing material layer consecutively, at 160-200° C. for 20-80 minutes, to form an intermediate product;
    (b) cold-pressing the intermediate product at 20-60° C. for 20-80 minutes;
    wherein the elastic plastic floor is moisture proof and sound insulated, and wherein the moisture proof and sound insulation layer comprises one or more of the polymers of an expanded ethylene-vinyl acetate copolymer, an expanded polyethylene, a styrene butadiene rubber, or a neoprene, and wherein the thickness of the moisture proof and sound insulation layer is 0.1-6 mm; and
    wherein at least one of the first backing material layer and the second backing material layer comprise 10-50 wt % organic polymer, and the organic polymer can be a mixture of Polyvinylchloride resin and vinyl resin; and
    the wear resistant layer has a surface that comprises an ultraviolet-curable coating, wherein the surface of the wear resistant layer does not touch or abut the decoration layer, and the ultraviolet-curable coating comprises oligomer, monomer and a photoinitiator.

7. The method of claim 6, wherein the wear resistant layer comprises one or more organic polymer, plasticizer, lubricant or stabilizer.

* * * * *